| United States Patent [19] | [11] | 4,415,771 |
|---|---|---|
| Martinez | [45] | Nov. 15, 1983 |

[54] PUBLIC ALERT AND ADVISORY SYSTEMS

[76] Inventor: Louis Martinez, 18939 Milmore Ave., Carson, Calif. 90746

[21] Appl. No.: 250,779

[22] Filed: Apr. 3, 1981

[51] Int. Cl.$^3$ .............................................. H04B 7/00
[52] U.S. Cl. ................................ 179/5 R; 179/2 EC; 455/102; 455/105
[58] Field of Search ................ 179/2 E, 2 EA, 2 EB, 179/2 EC, 5 R, 5 P; 340/539; 455/102, 105

[56] References Cited

U.S. PATENT DOCUMENTS

| 2,280,421 | 4/1942 | Chappel et al. | 340/539 X |
| 3,714,375 | 1/1973 | Stover | 179/2 EC |
| 4,117,405 | 9/1978 | Martinez | 455/51 |
| 4,208,630 | 6/1980 | Martinez | 455/51 X |
| 4,241,326 | 12/1980 | Odom | 340/539 X |
| 4,296,496 | 10/1981 | Sadler | 455/102 X |

FOREIGN PATENT DOCUMENTS 2950387 6/1981 Fed. Rep. of Germany ...... 340/539

OTHER PUBLICATIONS

*IEEE Transactions on Communication Technology;* vol. Com-10, No. 3, Jun. 1971, pp. 241-246; "Minimum--Bandwidth Multiplex Radioteleprinter System", by R. D. Tottingham.

*Electronics;* vol. 52; No. 1; Jan. 4, 1979; pp. 67 and 68; "Paging System Broadcasts Nationwide on FM Radio Channel".

*Primary Examiner*—G. Z. Rubinson
*Assistant Examiner*—Keith E. George
*Attorney, Agent, or Firm*—Blakely, Sokoloff, Taylor & Zafman

[57] ABSTRACT

Public alert and advisory systems for the communication of emergency and/or other information from one or more central locations to a plurality of remote locations, such as, by way of example, information regarding a nuclear accident and evacuation procedures. This system utilizes conventional programming stations such as AM, FM or TV stations, central transmitting equipment, with the emergency information being modulated by a second modulation technique differing from the first modulation technique for the ordinary programming so that conventional manually operated programming receivers will not be responsive to the emergency information. The receivers of the system however, are responsive to the transmitted emergency information, so as to sound a warning alarm, display codes relating to evacuation or other information and/or receive and present audio information depending upon the specific configuration of the system. Normally the remote receivers are given recognition codes so that the receiver may be given different emergency information, either on an individual or on a group to group basis. Fault detection is provided by configuring the remote receivers to automatically provide a fault indication if not periodically reset by the communications link. A unique telephone link, also disclosed, can be used for reliability testing or for ordinary data communication. Various embodiments and features are disclosed.

40 Claims, 5 Drawing Figures

PUBLIC ALERT AND ADVISORY SYSTEMS

BACKGROUND OF THE INVENTION

1. Field of the Invention

The present invention relates to the field of voice and data communications, and more particularly, unilateral and bilateral communications not depending on human intervention at both ends of the communication link.

2. Prior Art

Various types of communication systems are well known in the prior art. Such systems generally fall into three categories, specifically, unilateral or bilateral systems for communication between two specific points, systems having a central transmitter and a plurality of receivers for broadcasting from the central point for reception as desired by any of the remote receivers, and systems having a plurality of transmitters for unilateral or bilateral transmission to a central receiver. Typical of the first type of communication systems are microwave systems, of the second type are standard AM, FM and television broadcast systems, and of the third type are police communication systems for communicating between various police cars and a central station. Of particular interest to the present invention is the second type, wherein information is to be transmitted from one, or at least a small number of transmitters, to a relatively large plurality of receivers.

More particularly, there is a need for communication systems to allow prompt publication of public alert and advisory information in specific types of emergencies, such as by way of example, in the event of an accident in a nuclear power plant which may allow release of radioactive materials into the atmosphere. By way of specific example, the Nuclear Regulatory Commission may soon require that 100% of the people located within five miles of a nuclear power plant be warned within 15 minutes of a nuclear accident, and that 95% of the people within five to ten miles of the power plant be similarly warned within 15 minutes. At the present time the primary system which might be used in an attempt to meet these requirements is the Emergency Broadcast System (EBS) which provides any required warning messages by interruption of conventional AM broadcast programming. This, of course, has the advantage of not requiring any special equipment at either the transmitter end (except perhaps for special lines for directing emergency messages to the transmitter) or at the receiving end. However, it has a number of disadvantages which make its usefulness highly limited. Effective communication requires that the AM receiver be both turned on and tuned to a station carrying the emergency broadcast. However, statistics show that most AM receivers are turned off most of the time (nuclear accidents can occur at any time during the day or night). Also, since the system depends upon interruption of normal AM broadcast programming, testing of the system, and particularly the testing of the effectiveness thereof is subject to great limitation. Further, in general antennas for conventional AM broadcast stations are not located at the site of nuclear power plants and do not have a range limited to ten miles, but instead commonly have random positions many miles from a nuclear power plant, and are effective at all for the EBS only because they serve an area of a radius of many tens of miles which encompasses the required region surrounding the nuclear power plant. Accordingly, the public alert information which is broadcast is broadcast not only to the area to be alerted, but to the entire area served by the AM station, partially defeating the purpose of the system as a result of the attraction of at least some people toward the area of emergency out of curiosity. In addition, while alert information can be broadcast, i.e., information regarding the nature of the accident or other public emergency, specific advisory information cannot, as the same advisory information is brought to all people in the area. In particular, while general evacuation instructions can be given, i.e., the location away from which people should evacuate, specific information directing people in some locations to evacuate via a certain route, and other people in other locations to evacuate via other routes, is more difficult to broadcast, as everyone in the broadcast area receives everyone's instructions, which at best will be a highly confusing situation. Thus, it is obvious that an ideal system would include the ability to broadcast and receive the required information at remote locations without the receiver being manually turned on, and would further include the ability to transmit specific instructions for various areas within the emergency region, with the people in any specific area within the emergency region only receiving that information applicable to them, and with none of the people outside of the emergency region even receiving the basic warning itself.

Other possibilities for such communication of course, would include the National Oceanagraphic and Atmospheric Administration broadcast system (NOAA), which is a 24 hour broadcast system, or for that matter, any other dedicated broadcast system for such purpose, though the requirement of a dedicated broadcast station and special receivers (fixed tuning and always on) is economically unattractive and does not provide the advantageous selective communication feature.

U.S. Pat. No. 4,117,405 and No. 4,208,630 entitled "Narrow Band Radio Communication System" and "Narrow Band Paging or Control Radio System", respectively, describe communication systems which allow the communication of information by the narrow band phase modulation of the carrier of a conventional AM broadcast station. In particular, in accordance with those patents, if one modulates the phase of the carrier of a conventional AM broadcast station within certain limits, information may be broadcast on the carrier of the AM station without detection by or significant interference with the operation of conventional AM radio receivers. Depending upon the limits of the phase modulation, compatible limits on the spectrum of the phase modulation may be imposed so that data may be communicated by the modulation of the carrier of the AM station at meaningful rates without detection by conventional AM receivers, the patents disclosing, by way of example, a phase modulation rate of 18 Hz and a phase modulation of plus or minus 15 degrees as being suitable for the purpose. In addition, the patents disclose a form of frequency synthesizer which may be used at the receivers to accurately reconstruct the unmodulated carrier frequency against which the phase changes can be measured, and to generate various other frequencies for various purposes. In U.S. Pat. No. 4,208,630, the AM carrier is being used to synchronize other transmitters and receivers in this manner, and to put out hourly time beep synchronization signals which are detected and used at both the control transmitter and at the plurality of receivers so as to synchronize the digital data pulses therebetween, and thereby precisely establish the time at which digital message bits will be transmitted and received.

An article entitled "Minimum-Bandwidth Multiplex Radio Teleprinter System" appearing in the June 1971 publication of the IEEE Transactions on Communication Technology described a data system using AM broadcast signals to carry teleprinter signals. Usable at medium or short wave frequencies, the multiplex technique provided point to point or broadcast teleprinter service utilizing existing transmitters and antennas. A minimum bandwidth phase modulation "subcarrier" was used to phase modulate the broadcast carrier, proportedly without disturbing operation of either the broadcast transmitter or receiver. The system used separate crystal oscillators at the source and at the receiver so that the data streams were not synchronized at the two locations, thereby requiring a transmitted identity for both the beginning of a digit and the beginning of a word. Such a system has not been widely used however, neither for radio teleprinter nor other communication, probably because of its low speed, lack of synchronization between the transmitter and receiver and non-selective communication characteristic thereof.

BRIEF SUMMARY OF THE INVENTION

Public alert and advisory systems for the communication of emergency and/or other information from one or more central locations to a plurality of remote locations, such as, by way of example, information regarding a nuclear accident and hotel fire warnings and evacuation procedures. This system utilizes conventional programming stations such as AM, FM or TV stations, central transmitting equipment, with the emergency information being modulated by a second modulation technique differing from the first modulation technique for the ordinary programming so that conventional manually operated programming receivers will not be responsive to the emergency informaton. The receivers of the system however, are responsive to the transmitted emergency information, so as to sound a warning alarm, display codes relating to evacuation or other information, and/or receive and present audio information depending upon the specific configuration of the system. Normally the remote receivers are given recognition codes so that the receiver may be given different emergency information, either on an individual or on a group to group basis. Fault detection is provided by configuring the remote receivers to automatically provide a fault indication if not periodically reset by the communications link. A unique telephone link, also disclosed, can be used for reliability testing or for ordinary data communication or end-to-end reliability testing. Various embodiments and features are disclosed.

DETAILED DESCRIPTION OF THE INVENTION

In accordance with the present invention, the preferred embodiment comprises a public alert and advisory system which utilizes as its transmitter an AM radio broadcast station providing 24 hour service of normal programming to the area served thereby. For transmission of the required information, the carrier of the radio station is modulated in a narrow band in a manner to be described in greater detail herein so that the information to be transmitted is modulated on the carrier in a manner which will not interfere with conventional AM broadcast programming. In particular, for the transmission of digital information, a narrow band phase modulation of the carrier is used to allow the transmission of digital information without detection by conventional receivers. In certain instances, band limited voice signals may also be transmitted to give verbal alert and advisory information, a feature which will also be subsequently described in greater detail. In the case of voice communication, which normally would be used only in true emergency situations or limited testing, some disturbance of normal AM broadcast reception might occur, though, because of voice band limiting employed herein, such disturbance would generally be confined to a deterioration in the quality and apparent background noise in the AM reception and not an override of the voice signal in the sound output of conventional AM receivers. Because the preferred embodiment utilizes conventional AM broadcast stations for the transmitting function, whereas the receivers and receiver functions are particularly unique in the present invention, at least some embodiments of the receivers will be described first.

Figure 1:
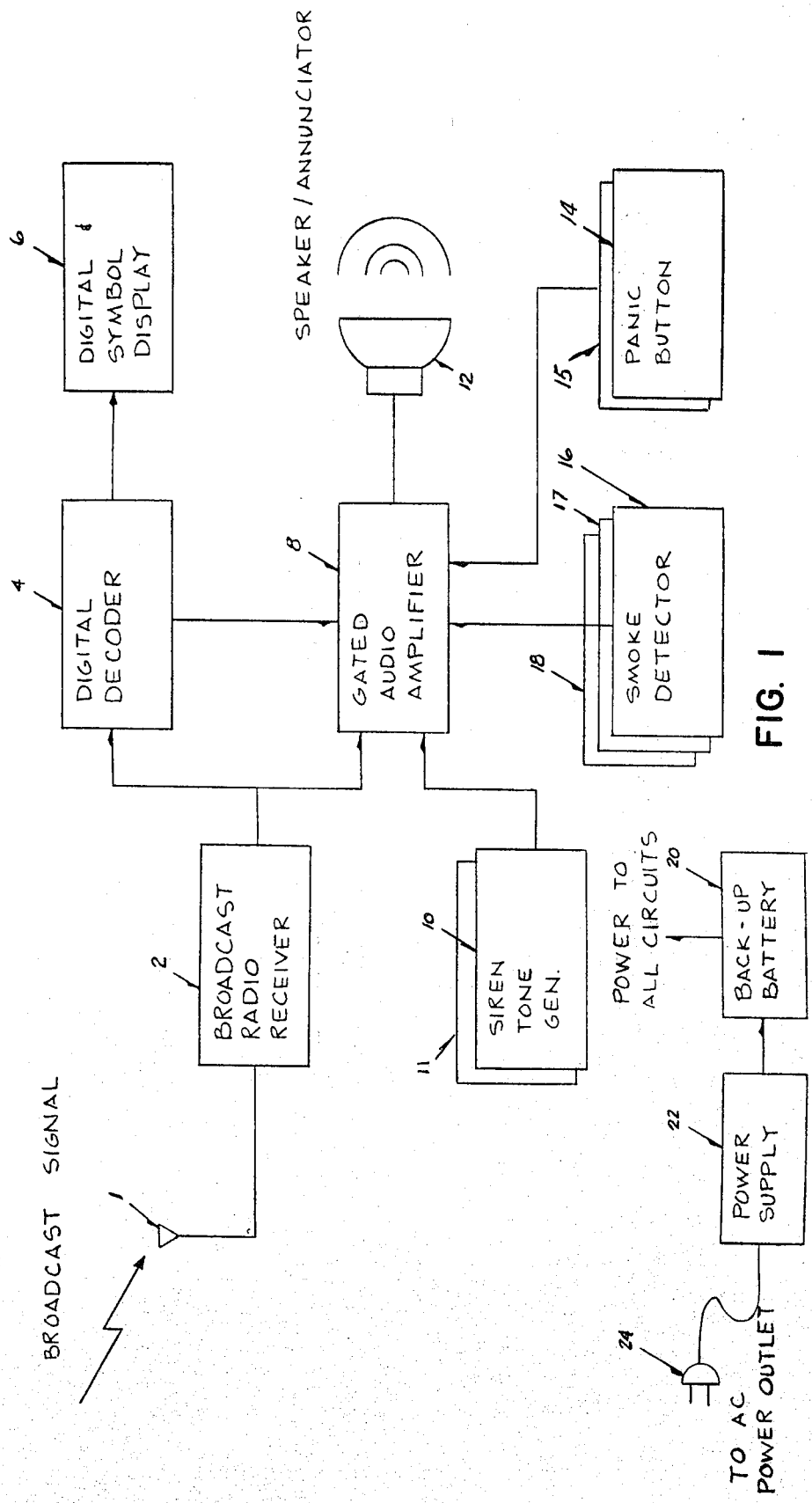
FIG. 1 is a block diagram of a typical public alert and advisory system receiver of the preferred embodiment of the present invention.

FIG. 1 is a block diagram of one embodiment of a public alert and advisory communication device (receiver) suitable for packaging in a small unit resembling a portable transistor radio, or packaging in an enclosure similar to and including the functions of a conventional smoke detector for installation in residences, hotels, hospital rooms or other locations to alert and advise residents of the existence of emergency conditions. In that regard it should be noted that such emergency conditions may exist very locally, such as by way of example, a fire within a particular building in which the device is used, or may exist in a larger area, such as by way of example, a nuclear accident, rising flood waters, or other emergency. In any case, the emergency conditions are communicated to the local device through preferably an AM broadcast station using quadrature modulation of the carrier in a manner subsequently described herein. Such modulation may be either phase or frequency modulation, or even a combination of the two as desired.

All or part of the components of the system of FIG. 1 can be used for various applications. By way of example, the device of FIG. 1 can be integrated with a conventional burglar alarm system 17, an energy over-consumption device detector 18, or smoke detector 16, or any of these various devices may be placed in parallel in such a manner so as to trigger an alarm when a dangerous condition exists. Burglar alarm systems, energy over-consumption devices and smoke detectors or course, are all well known devices, and are commonly configured to provide an electrical signal output intended to communicate the existence of the condition to be detected, either by way of sounding an alarm or providing a data input for recording or initiating other action, and accordingly details of the various circuits used for these devices are well known and not presented herein.

One important application of the device of FIG. 1 is the communication of alert and advisory messages to residences and public places around nuclear power plants when a significant incident occurs at the plant. In such applications, the alert condition is detected by nuclear plant personnel and/or sensing equipment, and transmitted to the broadcast station by way of a dedicated phone line or other well known communication means. The broadcast station then transmits a digital alert message which comprises an address portion and a message portion to the devices of FIG. 1 through a phase modulated, narrow band signal for digital data, or band limited voice signals. These phase modulated signals are detected by antenna 1 which is connected to the receiver 2 that selects and amplifies the desired phase modulated broadcast (AM carrier) signal, and communicates it to the digital decoder 4 where it is decoded to determine if the digital signal address portion corresponds with the fixed digital address assigned to the particular digital decoder 4. If it does, the alert message portion is sent to digital and symbol display 6 where it is displayed to the resident. Different symbols (numeric or alphanumeric) or words can be displayed in display 6 in order to advise the resident of the nature of the alert and the action they are to take, either by direct reading of the symbol display or by reference to fixed directions coded to the various possible digital symbol display outputs. By way of example, numerical characters could be employed to display various geographic areas, room numbers, floor numbers, or other location information, while alphabetical characters could be used to display the level of alert, i.e., the seriousness of the problem and the action which should be taken.

The digital decoder 4 also provides enabling signals to the gated amplifier 8 to gate the amplifier to pass either a voice signal or the signal from the siren tone generator 10 or digital voice synthesizer 11 to speaker/enunciator 12 so that beep, voice or other loud signals are emitted to alert the resident. It is thus possible for a central location such as a nuclear power plant, fire station or other public safety location to communicate alpha-numeric, or one of several predigitized voice messages, or real time voice alert messages and advisory information to specific residences, hotel rooms, hospitals and the like.

As previously mentioned, the device of FIG. 1 can also be integrated with the smoke detector 16, burglar alarm 7 or an energy over-consumption device 18 by way of example, in order to take advantage of common circuits, power source and physical package to achieve economies in production, facilitate user acceptance and minimize the number of separate emergency devices required at a specific location. For example, smoke detector 16, upon detecting the presence of smoke, enables gated amplifier 8, which then passes the signal from siren tone generator 10 to speaker/enunciator 12, causing it to emit an audible alert signal. Thus, as can be seen from the foregoing description, a single integrated system as shown in FIG. 1 may be responsive to self-generated inputs such as by way of example, an integrated smoke detector detection signal, locally generated inputs such as burglar alarm inputs as sensed by sensors at various points within the room or larger enclosure, and broadcast inputs such as the basic public warning and advisory information inputs, or energy shortage alerts from local electric utilities.

Power supply 22 is preferable energized by the household electrical supply through a power cord and connector 24, continually recharging back-up battery 20 which in turn energizes all circuits of the device of FIG. 1. Battery 20 permits the device to be disconnected from the household power outlet so that it may be carried by a person when instructed to evacuate the building so the the person can receive continuing updated information during the evacuation. In that regard, a tamper detection switch 15 can be included in the circuit of FIG. 1 to cause an audible alarm signal to be generated when the communicator device is accidentally or intentionally removed from its installed position or accidentally unplugged from an AC wall socket. This might occur when children remove it from its installed location without parent's approval. The audible signal can be turned off by simultaneously depressing two separate buttons, for example, the tamper detect push button and alarm reset push button, and this is made intentionally complicated so as to prevent youngsters from disconnecting the unit and resetting the alarm. Preferably the alarm sounded would be readily distinguishable from the alarm sounded in a true emergency by intermittently gating the audio-amplifier 8 so that a repetitive short and low duty cycle alarm is sounded through the speaker enunciator to distinguish it from a true emergency condition and to provide a minimum drain on the back-up battery 20 which would then be powering all circuits, yet still provide an alarm indicating the undesired condition to prompt the reattachment to the device to the public power supply.

If the communicator device is intentionally removed from its installed position so as to carry it along during the evacuation, then the pressing of the tamper detection button and the alarm reset button simultaneously indicates to the microprocessor within the communicator that the communicator device is in a portable mode and consequently indicates that geographic coded information must also be displayed on display 6.

Additional features of the device of FIG. 1 include the optional panic button 14 which enables gated amplifier 8 and sounds an audible alarm in the manner previously discussed. Obviously this provides a self-test feature for at least the amplifier and speaker portion of the system and can be used momentarily to attract attention of people in the area and can be used as a first level emergency warning for fires, etc. in the immediate area not yet detected by the smoke detector. Other applications and variations of the embodiment of FIG. 1, of course, will become evident to those experienced in the art.

Figure 2:
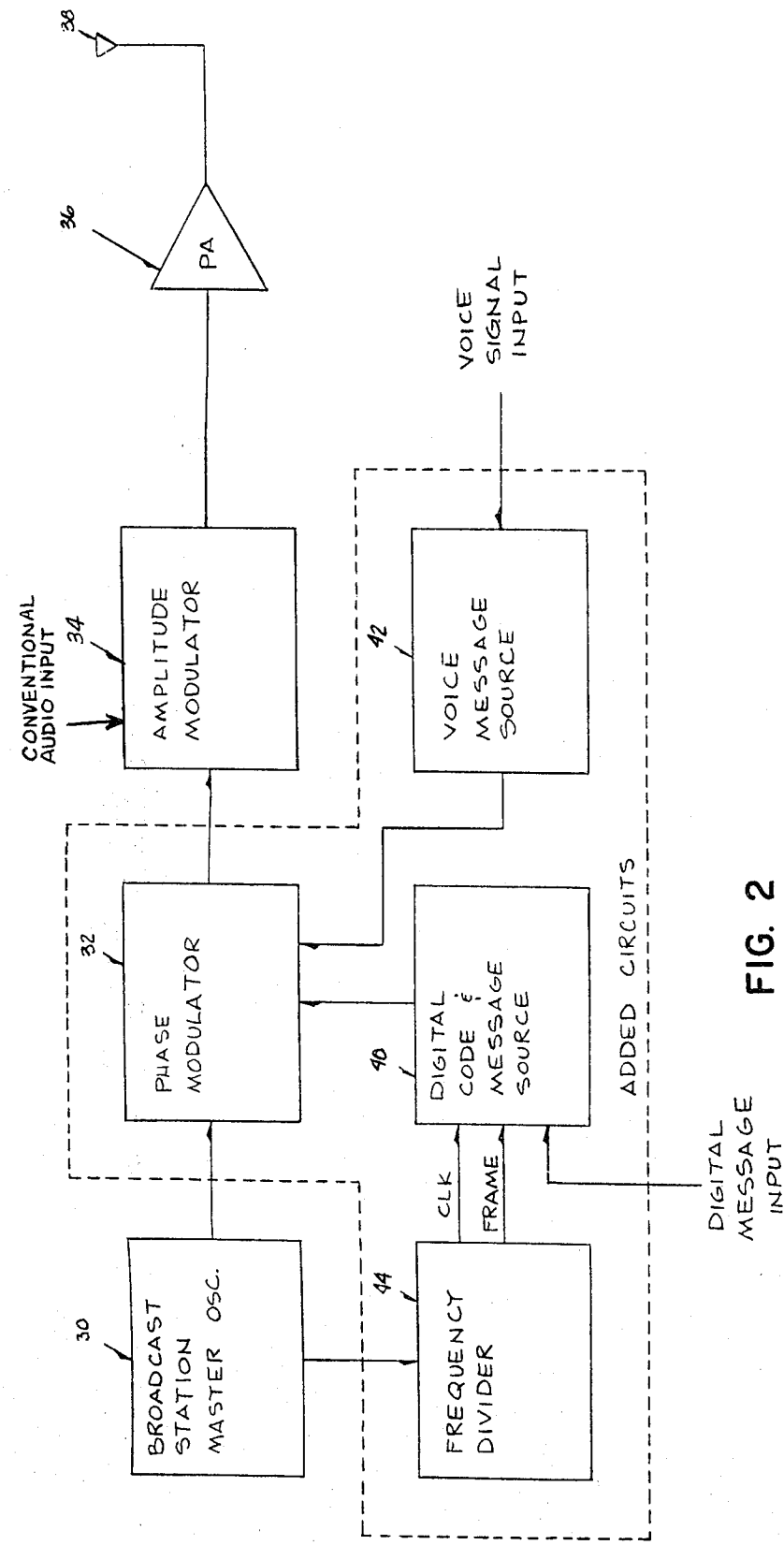
FIG. 2 is a block diagram of a typical AM broadcast station illustrating the changes therein to broadcast the public alert and advisory information.

FIG. 2 illustrates the modifications necessary to a conventional AM broadcast station to permit it to transmit phase modulated signals in the desired manner. The circuits which are added to the existing broadcast station are shown within the dotted line in FIG. 2. The basic modulation technique for the digital information is substantially the same as that described in U.S. Pat. Nos. 4,208,630 and 4,117,405, further briefly reviewed herebelow.

Broadcast station oscillator 30 provides the basic radio frequency source for the conventional broadcast station. Oscillator 30 is amplified and applied to amplitude modulator 30, the output of which is further amplified in amplifier 36 and modulated by conventional audio program modulator 34 and radiated through antenna 38. In most cases amplitude modulator 34 and power amplifier 36 are integrated in one circuit (i.e. amplitude modulation is inserted through a transformer connected in the plate circuit of the power amplifier). The modification which is made to the broadcast station includes the insertion of phase modulator 32, digital source 40, band limited voice source 42 and divider 44. Phase modulator 32 is driven by a voice source 42 and/or digital code and message source 40. Source 40 is in turn provided with a digital clock signal and timing frame by frequency divider 44 in such a manner so as to syncronize the digital data to the clock and frame derived from master oscillator 30. By way of example, frequency divider 44 divides the master oscillator 30 down to a clock pulse frequency of approximately 16 Hz in the preferred embodiment. Thus, 16 clock pulses are defined as a frame, the frame therefore being one second long and effectively derived from frequency divider 44. Digital code and message source 40 receives externally provided messages, digitizes them and transmits them in a manner synchronized to the clock and frame signals. Further details of this technique are described in the two foregoing patents.

Voice message source 42 also modulates phase modulator 32 in what is typically referred to as small angle modulation wherein the amount of phase deviation is constrained to substantially less than one radian. For instance, a typical linear modulation deviation of plus or minus 30 degrees can be employed so as to not generate significant harmonics of the voice signal spectrum in the RF sideband of the broadcast station signal. Consequently minimal adjacent channel radio interference will exist under these conditions. The voice signals are further constrained (i.e. band limited) into a bandwidth of approximately 2K Hz which is adequate for voice message transmission. Any harmonic sidebands which may exist are of very low level and will, at worst, appear at 4, 6, 8 and 10 K Hz and thus be well within the assigned channel space of the U.S. broadcast station. Furthermore, constraining the voice signals to an upper frequency range of about 2K Hz minimizes the possibility of detection of these phase modulated audio signals by conventional amplitude modulated consumer radio receivers even when slightly detuned. In other words there is minimal, essentially non-existant interaction (i.e. cross talk) between the phase modulated signals communicated by this system and the conventional amplitude modulated audio program material being broadcast by the station at the same time. In this respect it is superior to proposed AM stereo modulation techniques, as the AM stereo signal must necessarily be of hi-fidelity and cannot be constrained to a 2K Hz audio bandwidth.

Figure 3A:
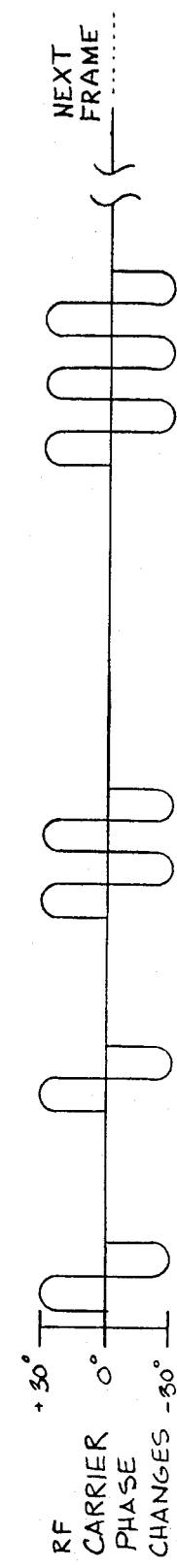
FIG. 3a is a figure illustrating the logic 1 and logic 0 phaze modulated signals.

FIG. 3a illustrates the typical digital format that can be employed in the system herein disclosed. A digital frame comprises sixteen bits, and each logic one bit is identified in the broadcast station transmission by a phase deviation of plus or minus 30 electrical degrees. This occurs during the time occupied by a logic one bit, with the signal for the logic one bit having an average phase deviation of zero degrees. A logic zero signal provides no phase modulation of the broadcast carrier, thereby providing both a zero average phase deviation method as with a logic one bit, and a zero instantaneous phase deviation throughout the logic zero time period, unlike the logic one bit. Since the bits within a frame are all derived from and therefore synchronized to the RF station master oscillator 30 of the broadcast station, it is possible to maintain synchronization of these digital bit-streams in a multiplicity of remotely located receivers by reconstructing the carrier frequency at the remote location, not by a separate oscillator, but by locking onto the carrier frequency of the AM broadcast station and by periodically sending a synchronizing signal in the manner described in detail in U.S. Pat. Nos. 4,208,630 and 4,117,405. Briefly restated, the synchronizing signal might be sent on an hourly basis to all remotely located receivers. Each receiver incorporates a frequency divider equivalent to divider 44 which is driven by an equivalent master oscillator 30 at each receiver that is phase-locked to the RF carrier of the broadcast station and, therefore, is able to develop clock and frame impulses synchronized to the broadcast station pulses. These enable the remote receivers to recognize the start and ending of each message frame and a specific time location of each digital bit in the frame without start and stop synchronizing pulses.

Figure 3B:
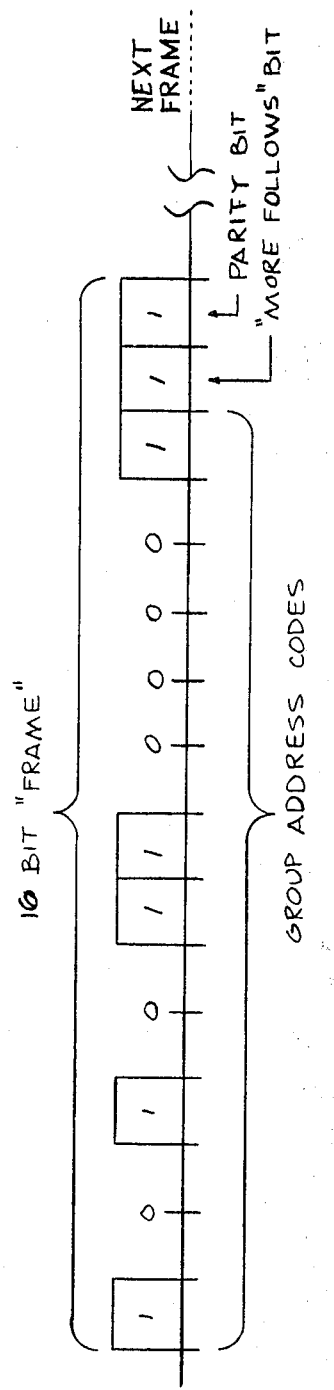
FIG. 3b is a diagram illustrating a typical 16 bit frame in the digital bit stream.

Now referring to FIG. 3b, a typical 16-bit frame contains 14 group identification bits, one parity bit and one "more follows" bit. The latter bit, when high, indicates the succeeding frame is part of the total message. The first frame could thus comprise the address portion and the second appended frame could be the message portion of the radio transmission. The hourly time synchronizing format is a unique bit combination employed for synchronizing purposes only. Specific unique message portions detected by the digital decoder 4 (FIG. 1) of the device may be used to gate the audio amplifier 8 for the beginning and end of voice communications. Of course, obviously, other digital formats could be implemented for use in the system as desired.

Figure 4:
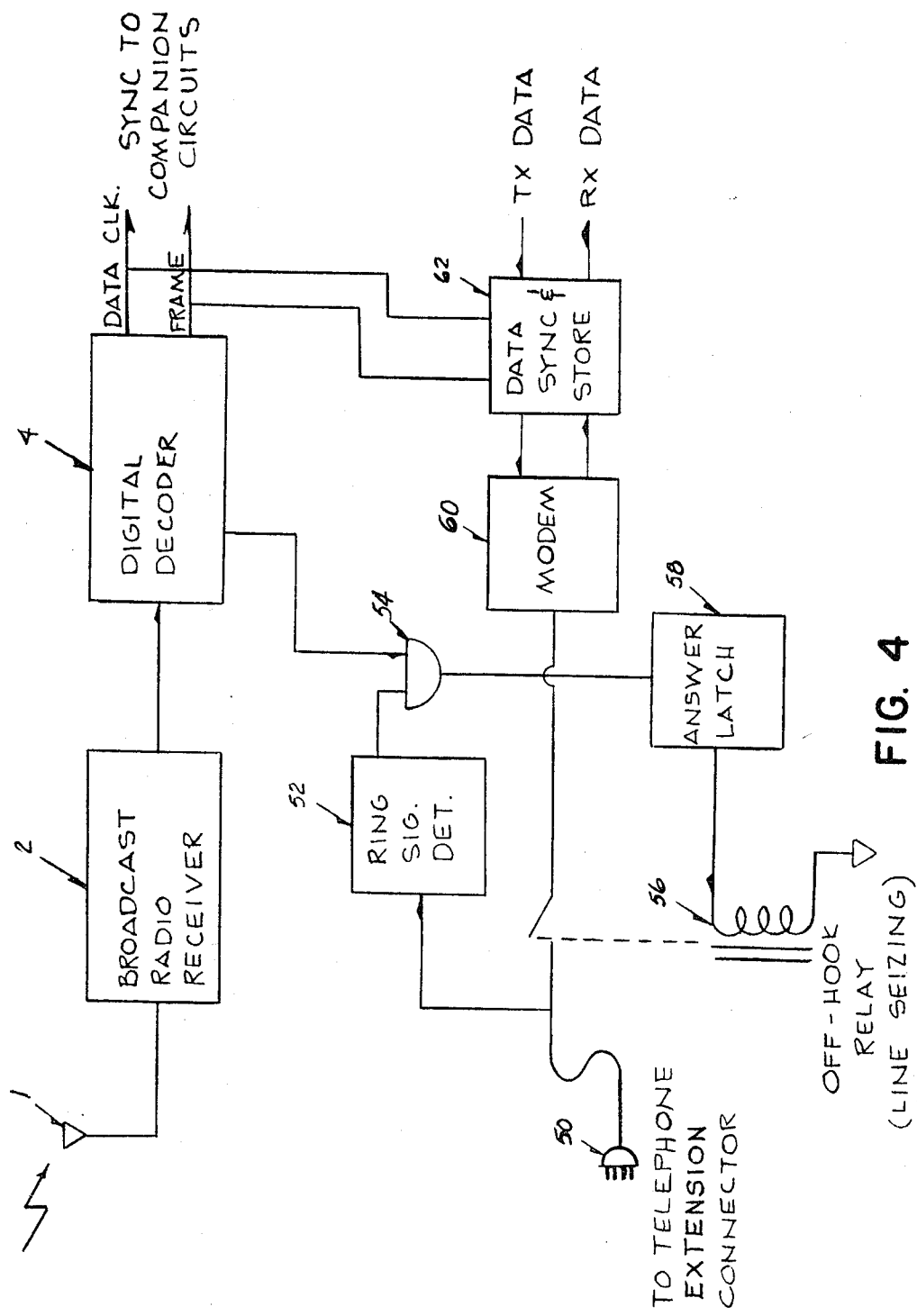
FIG. 4 is an alternate form of receiver for remote telephone control.

Another aspect of the present invention is the phone line communication capability of the system. In particular, FIG. 4 illustrates a preferred circuit arrangement for remote telephone control. Briefly stated, this circuit automatically establishes a telephone data link between a central location and any specific remote location using existing telephone dial-up circuits in such a manner as to provide unattended answering by the remote telephone station without ringing and thus without disturbing persons in the area. Such a phone can be employed to listen to verify the reliability of the radio alert receiver, or for other purposes.

Referring specifically to FIG. 4, the AM broadcast radio receiver 2 detects radio signals at its pretuned radio frequency through antenna 1 as before, and extracts the quadrature modulation (i.e., phase modulation or frequency modulation) digital signal in the manner previously described. This digital signal is sent to digital decoder 4 which compares the address portion of the digital signal against a stored code to determine if it is a signal for which it must respond and, if so, it subsequently decodes the message portion of the digital signal to determine what action it is to take. Thus, these functions are as described with respect to the embodiment of FIG. 1.

If the message portion designates that the remote receiver device is to answer the telephone, say within the next 30 seconds, then decoder 4 sends a request to "ANSWER PHONE" signal to the AND gate 54. At the same time, the central computer or other control device to which communication is to be established which initiated the aforesaid broadcast digital signal transmission also commences to automatically dial to the regular switched telephone network the phone number of the phone line which is colocated with the radio receiver detector (of FIG. 4). If for some reason the line is busy, as by a voice communication on another phone on the same line, it will try again, either within the same 30 second time period or will reinitiate a communication at a later time by rebroadcasting the specific request to "ANSWER PHONE" for that address. As may be imagined from the foregoing description, latch 58 automatically releases the phone 50 after a preset time of, for example, the 30-second period hereinbefore mentioned, so that the phone will ring (assuming the circuitry of FIG. 4 is part of an ordinary phone receiver with hand set, etc.) for ordinary incoming calls.

Thus, as hereinbefore described, shortly after the request to "ANSWER PHONE" signal from decoder 4 is applied to AND circuit 54, the telephone central office nearest the called phone station sends a ring signal of approximately 40 volts RMS amplitude and 20 Hz frequency (i.e. a conventional ring signal), which is detected by the ring signal detector 52 through extension connector 50. The ring signal detector 52 immediately sends a signal to AND circuit 54, which sets answer latch 58 and thus trips off hook relay 56 to immediately answer the telephone and prevent any ringing signal from sounding in the phone in which the circuit is added or in any other phones that may be attached on the same phone line as the number being dialed.

Once a ring signal is detected and the off hook relay is switched to seize the telephone line without ringing, modem 60 is connected to the phone line and a communication link between the remote phone station and the central computer is established. Modem 60 may be an extremely simple modem and could comprise, for example, a simple voltage controlled oscillator designed to frequency shift key (FSK) upon the presence of a logic zero or one in a serial bit stream during transmission (TX) mode or, in a receiving mode, it could incorporate a single phase lock loop arrangement whereby an output digital stream of logic zero and one voltage levels exist when receiving an FSK signal. These and othe simple circuit techniques for modem 60 are relatively well known to those skilled in the art. Simplification of modem 60 is achieved by virtue of the addition of data synch and store circuit 62, which operates as follows: Digital decoder 4 provides a data clock and frame signals; for example, a 16 bit per second clock and a one second frame as discussed hereinbefore. These clock and frame signals are sent to circuit 62 to clock out and transmit data by the modem 60 in a digital bit stream synchronized with other data being sent and centrally received and synchronized over-all by the broadcast station. Conversely, when the remote telephone station answers the telephone and detects a digital bit stream, this bit stream will be in synchronism with the data clock and frame signal output of decoder 4. Consequently, this provides a simple means of identifying digital frame starting and stopping points and individual digital pulses. In other words, the circuit of FIG. 4 operates in a fully synchronous data transmission mode as if a separate dedicated sync or clock line were used, though instead synchronization is established by the broadcast station radio signal, greatly simplifying the system design and enabling unattended operation. Obviously, in other embodiments any other communication means, other than the phone line itself, may be used to remotely enable the auto answer function, if desired.

The systems described herein have been described with respect to conventional AM broadcast station modification so that useful information can be modulated on the same broadcast signal as the AM station uses for normal broadcasting without being detected by conventional receivers. The technique, of course, is based upon the fact that amplitude modulation as used by the AM broadcast stations and by conventional AM receivers, represents a first modulation technique which is substantially the only modulation technique to which the receivers are responsive. Consequently, useful information can be modulated onto the AM carrier using a second modulation technique to which conventional AM receivers are not responsive, a specific example being quadrature modulation of the AM carrier, so that special receivers responsive to the quadrature modulation may be used to detect and respond to the public alert and advisory information. Obviously however, the present invention techniques are not limited to conventional AM broadcast stations, but can be used in conjunction with FM broadcast and/or conventional TV broadcast stations utilizing conventional first modulation techniques for the broadcast of normal programming and a second modulation technique for the public alert and advisory information. In that regard, the first modulation technique, of course, will be the modulation technique generally used for normal programming, whereas the second modulation technique, while normally being an entirely different modulation technique, might merely be a modulation similar to the first modulation, though out of the range of responsiveness of receivers commonly used to respond to the first modulation technique. Thus, while the preferred embodiments of the present invention have been disclosed and described herein with respect to conventional AM broadcast stations, it will be understood that various changes in form and detail may be made therein without departing from the spirit and scope of the invention, whether by way of various modifications of an AM broadcast based system or upon adoption of the present invention to other conventional broadcast systems and modulation techniques.

I claim:

1. A public alert and advisory system comprising:

a central transmitter station including first transmitter modulation means for modulating a signal to be transmitted with programming, using double sideband amplitude modulation, for transmission of the programming to manually controllable first receivers having first receiver demodulation means responsive to double sideband amplitude modulated signals for the reception and demodulation of said modulated signal to allow selective perception of the programming by members of the public, second modulation means coupled to said central transmitter station for modulation of the signal to be transmitted with public alert and advisory information utilizing narrow band small angle quadrature modulation of the carrier of the amplitude modulated signal, to which said first receiver demodulation means are not primarily responsive, alert and advisory signal means coupled to said second modulation means for providing a signal responsive to alert and advisory information thereto which is at least partially a voice signal, a plurality of remote second receivers, each of said second receivers having second receiver demodulation means responsive to said narrow band small angle quadrature modulation for the reception and demodulation of the transmitted signal to provide the public alert and advisory information at the respective remote location, said second receivers each also including presentation means for presenting said alert and advisory information in humanly perceivable form at the respective remote location, said second receiver each further including self initiating means coupled to said second receiver demodulation means for presenting a humanly perceivable malfunction signal at the respective remote location if said self initiating means is not periodically reset by a reset signal received from said second receiver demodulation means, and means coupled to said second modulation means of said central transmitter to provide a periodic signal thereto for transmission to and demodulation by said remote second receivers to periodically provide said reset signal thereto, whereby said humanly perceivable malfunction signal will be presented at the remote location of any said second remote receiver not receiving and responsive to said reset signal.

2. The system of claim 1 wherein said alert and advisory signal means includes means for providing any of a plurality of identification signals to said second modulation means, and wherein said remote second receivers each include means responsive to an associated identification signal to enable said respective presentation means therein, whereby specific public alert and advisory information may be transmitted to all said remote second receivers and presented in humanly perceivable form by predetermined ones of said remote second receivers comprising less than all said remote second receivers.

3. The system of claim 1 wherein said voice signal is a signal sufficiently limited in frequency so as to not be readily perceivable utilizing first receivers responsive to said first modulation technique.

4. The system of claim 1 wherein said alert and advisory signal means is a means for providing a signal to said second modulation means which is at least partially in digital form.

5. The system of claim 4 wherein said remote second receivers are responsive to signals in both voice and digital form modulated by narrow band small angle quadrature modulation of the carrier of the amplitude modulated signal to display information responsive to the digital signal and to present the voice signal in audible form.

6. The system of claim 1 wherein said remote second receivers are operative on conventional AC power.

7. The system of claim 6 wherein said remote second receivers each include battery means to remain operative upon disconnecting from or loss of AC power.

8. The system of claim 7 wherein said second remote receivers each may be manually disconnected from AC power for use as portable receivers, and which thereupon display additional information such as geographic codes transmitted by the second modulation means.

9. The system of claim 8 wherein said second remote receivers contain means for providing power loss alarm upon accidental disconnection from AC power.

10. The system of claim 9 further comprised of manually operative means in each remote second receiver for shutting off said power loss alarm when the respective said remote second receiver is intentionally disconnected from AC power for portable use.

11. The system of claim 1 further comprised of smoke detection means for providing an audible alarm upon the sensing of smoke.

12. The system of claim 1 wherein said central transmitter station includes means for providing a phone control signal to said second modulation means for modulation and transmission to said remote second receivers, and wherein at least some of said second remote receivers include;

phone control means, phone answering means, and data communication means, said phone control means being coupled to said second receiver demodulation means and to said phone answering means to enable said phone answering means in response to said phone control signal, said phone answering means also being coupled to a phone line and said data communication means, said phone answering means, when enabled, being a means for sensing a ring signal on said telephone line, providing an off hook signal thereto, and coupling said data communication means to said phone line, said data communication means being a means for communicating data over a phone line.

13. The system of claim 12 further comprised of means for enabling said phone answering means for a predetermined length of time after said phone control means receives said phone control signal.

14. A public alert and advisory system comprising;

a central transmitter station including first transmitter modulation means for modulating a signal to be transmitted with programming, using a first modulation technique comprising double sideband amplitude modulation, for transmission of the programming to manually controllable first receivers having first receiver demodulation means responsive to signals modulated with said first modulation technique for the reception and demodulation of said modulated signal to allow selective perception of the programming by members of the public, second modulation means coupled to said central transmitter station for modulation of the signal to be transmitted with identification codes and public alert and advisory information associated therewith utilizing a second modulation technique comprising narrow band phase modulation of the carrier of the amplitude modulated signal wherein the phase and frequency of the phase modulation is limited so that the carrier of the amplitude modulated signal stays within legally prescribed limits for commercial AM broadcast stations when modulated by said alert and advisory signal, to which said first receiver demodulation means are not primarily responsive, alert and advisory signal means coupled to said second modulation means for providing a signal containing identification codes and alert and advisory information thereto, which signal is at least partially a band limited voice signal, a plurality of remote second receivers, each having assigned thereto a predetermined identification code, each of said second receivers having second receiver demodulation means responsive to signals modulated with said second modulation technique for the reception and demodulation of the transmitted signal to provide the public alert and advisory information at the respective remote location, said second receivers each also including code recognition means for recognizing said predetermined identification code of the respective said remote second receiver, and presentation means for presenting said alert and advisory information in humanly perceivable form at the respective remote location upon recognition of said recognition code, said second receivers each further including self initiating means coupled to said second receiver demodulation means for presenting a humanly perceivable malfunction signal at the respective remote location if said initiating means is not periodically reset by a reset signal received from said second receiver demodulation means, and means coupled to said second modulation means of said central transmitter to provide a periodic signal thereto for transmission to and demodulation by said remote second receivers to periodically provide said reset signal thereto, whereby said humanly perceivable malfunction signal will be presented at the remote location of any said second remote receiver not receiving and responsive to said reset signal.

15. The system of claim 14 wherein said alert and advisory signal means is a means for providing a signal to said second modulation means which is at least partially in digital form.

16. The system of claim 14 wherein said remote second receivers are responsive to signals in both voice and digital form modulated in accordance with said second modulation technique to display information responsive to the digital signal and to present the voice signal in audible form.

17. The system of claim 14 wherein said voice signal is a signal sufficiently limited in frequency so as to not be readily perceivable utilizing first receivers responsive to said first modulation technique.

18. The system of claim 14 wherein said remote second receivers are operative on conventional AC power.

19. The system of claim 18 wherein said remote second receivers each include battery means to remain operative upon disconnecting from or loss of AC power.

20. The system of claim 19 wherein said second remote receivers each may be normally disconnected from AC power for use as portable receivers.

21. The system of claim 20 wherein said second remote receivers contain means for providing power loss alarm upon accidental disconnection from AC power.

22. The system of claim 21 further comprised of manually operative means in each said remote second receiver for shutting off said power loss alarm when the respective said remote second receiver is intentionally disconnected from AC power for portable use.

23. The system of claim 14 further comprised of smoke detection means for providing an audible alarm upon the sensing of smoke.

24. The system of claim 14 wherein said central transmitter station includes means for providing a phone control signal to said second modulator means for modulation and transmission to said remote second receivers, and at least some of said second remote receivers include;
phone control means,
phone answering means, and
data communication means, said phone control means being coupled to said second receiver demodulation means and to said phone answering means to enable said phone answering means in response to said phone control signal, said phone answering means also being coupled to a phone line and said data communication means, said phone answering means, when enabled, being a means for sensing a ring signal on said telephone line, providing an off-hook signal thereto, prior to ringing, and coupling said data communication means to said phone line, said data communication means being a means for communicating data over a phone line.

25. The system of claim 24 further comprised of means for enabling said phone answering means for a predetermined length of time after said phone control means receives said phone control signal.

26. A public alert and advisory system comprising;
a central transmitter station including first transmitter modulation means for modulating a signal to be transmitted with programming, using double sideband amplitude modulation for transmission of the programming to manually controllable first receivers having first receiver demodulation means responsive to double sideband amplitude modulated signals for the reception and demodulation of said modulated signal to allow selective perception of the programming by members of the public,
second modulator means coupled to said central transmitter station for modulation of the signal to be transmitted with public alert and advisory information utilizing narrow band small angle quadrature modulation of the carrier of the amplitude modulated signal, to which said first receiver demodulation means are not primarily responsive,
alert and advisory signal means coupled to said second modulation means for providing a signal responsive to alert and advisory information thereto which is at least partially a voice signal, and
a plurality of remote second receivers, each of said second receivers having second receiver demodulation means responsive to signals modulated with said narrow band small angle quadrature modulation technique for the reception and demodulation of the transmitted signal to provide the public alert and advisory information at the respective remote location, said second receivers each also including presentation means for presenting said alert and advisory information in humanly perceivable form at the respective remote location.

27. The system of claim 26 wherein said alert and advisory signal means includes means for providing any of a plurality of identification signals to said second modulation means, and wherein said remote second receivers each include means responsive to an associated identification signal to enable said respective presentation means therein, whereby specific public alert and advisory information may be transmitted to all said remote second receivers and presented in humanly perceivable form by predetermined ones of said remote second receiver comprising less than all said remote second receivers.

28. The system of claim 26 wherein said alert and advisory signal means is a means for providing signal to said second modulation means is at least partially in digital form.

29. The system of claim 26 wherein said voice signal is a signal sufficiently limited in frequency so as to not be readily perceivable utilizing first receivers responsive to a double sideband amplitude modulated signal.

30. The system of claim 26 wherein said remote second receivers are responsive to signals in both voice and digital form modulated utilizing narrow band small angle quadrature modulation of the AM carrier to display information responsive to the digital signal and to present the voice signal in audible form.

31. The system of claim 26 wherein said central transmitter station includes means for providing a phone control signal to said second modulation means for modulation and transmission to said remote second receivers, and wherein at least some of said second remote receivers include;
phone control means,
phone answering means, and
data communication means, said phone control means being coupled to said second receiver demodulation means and to said phone answering means to enable said phone answering means in response to said phone control signal, said phone answering means also being coupled to a phone line and said data communication means, said phone answering means, when enabled, being a means for sensing a ring signal on said telephone line, providing an off-hook signal thereto, and coupling said data communication means to said phone line, said data communication means being a means for communicating data over a phone line.

32. The system of claim 31 further comprised of means for enabling said phone answering means for a predetermined length of time after said phone control means receives said phone control signal.

33. The system of claim 32 wherein said phone answering means, when enabled, is a means for substantially immediately providing an off-hook signal upon receiving a ring signal and for sufficiently suppressing the ring signal to prevent audible ringing at the remote location.

34. A public alert and advisory system comprising:
a central transmitter station including first transmitter modulation means for modulating a signal to be transmitted with programming, using a first modulation technique, for transmission of the programming to manually controllable first receivers having first receiver demodulation means responsive to signals modulated with said first modulation technique for the reception and demodulation of said modulated signal to allow selective perception of the programming by members of the public,
second modulation means coupled to said central transmitter station for modulation of the signal to be transmitted with public alert and advisory information utilizing a second modulation technique to which said first receiver demodulation means are not primarily responsive,
alert and advisory signal means coupled to said second modulation means for providing a signal responsive to alert and advisory information thereto,
a plurality of remote second receivers, each of said second receivers having second receiver demodulation means responsive to signals modulated with said second modulation technique for the reception and demodulation of the transmitted signal to provide the public alert and advisory information at the respective remote location, said second receivers each also including presentation means for presenting said alert and advisory information in humanly perceivable form at the respective remote location, said second receivers each further including self initiating means coupled to said second receiver demodulation means for presenting a humanly perceivable malfunction signal at the respective remote location if said self initiating means is not periodically reset by a reset signal received from said second receiver demodulation means, and
means coupled to said second modulation means of said central transmitter to provide a periodic signal thereto for transmission to and demodulation by said remote second receivers to periodically provide said reset signal thereto, whereby said humanly perceivable malfunction signal will be presented at the remote location of any said second remote receiver not receiving and responsive to said reset signal, and wherein said central transmitter station includes means for providing a phone control signal to said second modulation means for modulation and transmission to said remote second receivers, and wherein at least some of said second remote receivers include;
phone control means,
phone answering means, and
data communication means, said phone control means being coupled to said second receiver demodulation means and to said phone answering means to enable said phone answering means in response to said phone control signal, said phone answering means also being coupled to a phone line and said data communication means, said phone answering means, when enabled, being a means for sensing a ring signal on said telephone line, providing an off-hook signal thereto, and coupling said data communication means to said phone line, said data communication means being a means for communicating data over a phone line.

35. The system of claim 34 further comprised of means for enabling said phone answering means for a predetermined length of time after said phone control means receives said phone control signal.

36. The system of claim 35 wherein said phone answering means, when enabled, is a means for substantially immediately providing an off-hook signal upon receiving a ring signal and for sufficiently suppressing the ring signal to prevent audible ringing at the remote location.

37. A public alert and advisory system comprising;
a central transmitter station including first transmitter modulation means for modulating a signal to be transmitted with programming, using a first modulation technique, for transmission of the programming to manually controllable first receivers having first receiver demodulation means responsive to signals modulated with said first modulation technique for the reception and demodulation of said modulated signal to allow selective perception of the programming by members of the public,
second modulation means coupled to said central transmitter station for modulation of the signal to be transmitted with identification codes and public alert and advisory information associated therewith utilizing a second modulation technique to which said first receiver demodulation means are not primarily responsive,
alert and advisory signal means coupled to said second modulation means for providing a signal containing identification codes and alert and advisory information thereto,
a plurality of remote second receivers, each having assigned thereto a predetermined identification code, each of said second receivers having second receiver demodulation means responsive to signals modulated with said second modulation technique for the reception and demodulation of the transmitted signal to provide the public alert and advisory information at the respective remote location, said second receivers each also including code recognition means for recognizing said predetermined identification code of the respective said remote second receiver, and presentation means for presenting said alert and advisory information in humanly perceivable form at the respective remote location upon recognition of said identification code, said second receivers each further including self initiating means coupled to said second receiver demodulation means for presenting a humanly perceivable malfunction signal at the respective remote location if said initiating means is not periodically reset by a reset signal received from said second receiver demodulation means, and means coupled to said second modulation means of said central transmitter to provide a periodic signal thereto for transmission to and demodulation by said remote second receivers to periodically provide said reset signal thereto, whereby said humanly perceivable malfunction signal will be presented at the remote location of any said second remote receiver not receiving and responsive to said reset signal, and wherein said central transmitter station includes means for providing a phone control signal to said second modulation means for modulation and transmission to said remote second receivers, and at least some of said second remote receivers include;

phone control means;

phone answering means, and data communication means, said phone control means being coupled to said second receiver demodulation means and to said phone answering means to enable said phone answering means in response to said phone control signal, said phone answering means also being coupled to a phone line and said data communication means, said phone answering means, when enabled, being a means for sensing a ring signal on said telephone line, providing an off-hook signal thereto, prior to ringing, and coupling said data communication means to said phone line, said data communication means being a means for communicating data over a phone line.

38. The system of claim 37 further comprised of means for enabling said phone answering means for a predetermined length of time after said phone control means receives said phone control signal.

39. A public alert and advisory system comprising;

a central transmitter station including first transmitter modulation means for modulating a signal to be transmitted with audio programming, using a first modulation technique, for transmission of the programming to manually controllable first receivers having first receiver demodulation means responsive to signals modulated with said first modulation technique for the reception and demodulation of said modulated signal to allow selective perception of the programming by members of the public, second modulation means coupled to said central transmitter station for modulation of the signal to be transmitted with public alert and advisory information utilizing a second modulation technique to which said first receiver demodulation means are not primarily responsive, alert and advisory signal means coupled to said second modulation means for providing a signal responsive to alert and advisory information thereto which is at least partially a voice signal, and a plurality of remote second receivers, each of said second receivers having second receiver demodulation means responsive to signals modulated with said second modulation technique for the reception and demodulation of the transmitted signal to provide the public alert and advisory information at the respective remote location, said second receivers each also including presentation means for presenting said alert and advisory information in humanly perceivable form at the respective remote location.

40. The system of claim 39 wherein said alert and advisory signal means includes means for providing any of a plurality of identification signals to said second modulation means, and wherein said remote second receivers each include means responsive to an associated identification signal to enable said respective presentation means therein, whereby specific public alert and advisory information may be transmitted to all said remote second receivers and presented in humanly perceivable form by predetermined ones of said remote second receivers comprising less than all said remote second receivers.

* * * * *

UNITED STATES PATENT AND TRADEMARK OFFICE
CERTIFICATE OF CORRECTION

PATENT NO. : 4,415,771

DATED : November 15, 1983

INVENTOR(S) : Louis Martinez

It is certified that error appears in the above-identified patent and that said Letters Patent is hereby corrected as shown below:

On the title page add:--[73] Assignee: McGraw-Edison Company Rolling Meadows, Illinois --.

Signed and Sealed this

Twenty-first Day of August 1984

[SEAL]

Attest:

GERALD J. MOSSINGHOFF

Attesting Officer    Commissioner of Patents and Trademarks